Dec. 10, 1963  F. WÖSSNER  3,113,644
SHOCK ABSORBER
Filed June 14, 1961  2 Sheets-Sheet 1

INVENTOR
Felix Wössner
By Richard Ernst
agt

United States Patent Office 3,113,644
Patented Dec. 10, 1963

3,113,644
SHOCK ABSORBER
Felix Wössner, Schweinfurt (Main), Germany, assignor to Fichtel & Sachs A.G., Schweinfurt (Main), Germany, a corporation of Germany
Filed June 14, 1961, Ser. No. 117,008
Claims priority, application Germany June 18, 1960
8 Claims. (Cl. 188—100)

This invention relates to devices for damping relative oscillatory movements of masses connected by resilient elements, and more particularly to shock absorbers for motor cars and the like in which oscillations of sprung masses relative to unsprung masses are damped by the movement of a piston in a fluid filled cylinder, the fluid having to pass through a conduit in the piston to permit movement of the latter.

More specifically, the invention is concerned with improved valve arrangements in pistons of shock absorbers of the afore-described types by means of which fluid flow is controlled both during the expansion and the contraction of the shock absorber. It is known to provide a shock absorber piston with conduits which connect the cylinder spaces above and below the piston. A portion of the total sectional passage area of the conduits is permanently open to permit fluid flow responsive to minor relative movements of the sprung and unsprung masses of a motor car, and to the corresponding relative movements of the piston and the corresponding cylinder.

In one known arrangement there are at least three separate conduits. One of the conduits is an auxiliary conduit and is permanently open. The other two are covered by respective plates of spring metal or the like which normally obstruct the corresponding conduits, but yield to predetermined fluid pressures to open one of the conduits in response to rapid compression and expansion of the shock absorber respectively.

It is a disadvantage of this arrangement that the transition from fluid passage through the auxiliary conduit only to a condition in which fluid passes both through the auxiliary conduit and one of the other conduits is sudden and is responsible for a point of discontinuity in the characteristic response curve of such a known shock absorber.

In other known type of shock absorber piston, there is no auxiliary conduit, and each main conduit has a circular orifice which is only partly covered by a spring plate. A sickle shaped opening remains permanently open. It is defined by two circular arcs about different centers one of which is formed by the edge of the spring plate.

This known arrangement is difficult to produce, difficult to adjust, and difficult to maintain in the adjusted condition. Any manufacturing tolerance, any radial shifting of the elements which define the opening greatly alters the permanently open free sectional passage area, and it is difficult to provide and maintain a predetermined response of the shock absorber to normal working stresses. The undesirable influence of unavoidable manufacturing tolerances and of minor maladjustments is directly related to the ratio between the permanently open and the maximum passage area. The smaller the permanently open area and the larger the fully open passage area, the more relatively minor factors will influence the shock absorber characteristics. Yet, it is generally desirable to make the cross sectional area of the fully open passage as large as feasible in order to minimize the difference between the pressure loaded areas of the valve in the open and the closed condition of the spring plate which constitutes the valve member of the arrangement.

The present invention aims at overcoming the shortcomings of the known devices. It is the primary object of the invention to provide a shock absorber of the cylinder-and-piston type which has a very smooth characteristic curve.

Another object is the provision of a shock absorber the performance of which is not adversely affected by manufacturing tolerances and by minor adjustment variations.

A further object is the provision of a shock absorber in which the controlled fluid passages have a relatively large cross sectional area, and in which the difference between the pressure loaded areas of the valve member in the open and closed condition of the passage is relatively small.

Yet another object is the provision of such a shock absorber in which the valve member in the closed position of the valve arrangement is firmly supported and cannot buckle under the pressure of the fluid.

An additional important object is the provision of a shock absorber which is quiet and smooth in operation.

With these and other objects in view, the invention in its more specific aspects contemplates the use of a substantially circular spring plate centrally mounted on the piston and normally extending radially outward to obstruct a major portion of an orifice of a conduit which connects the two axial end faces of the piston, but to leave a minor portion of the orifice permanently unobstructed for the passage of fluid through the conduit. When the pressure of the fluid exceeds a predetermined value, the spring plate is resiliently moved away from the orifice to provide a larger passage area. A free edge portion of the spring plate intersects the orifice and defines the boundary between the afore-mentioned minor and major portions in the normal spring plate position. The circumferential length of the intersecting edge portion should not be more than twice the largest radial dimension of the minor portion.

The exact nature of this invention as well as other objects and advantages thereof will be readily apparent from consideration of the following specification relating to the annexed drawing in which.

Figure 1:
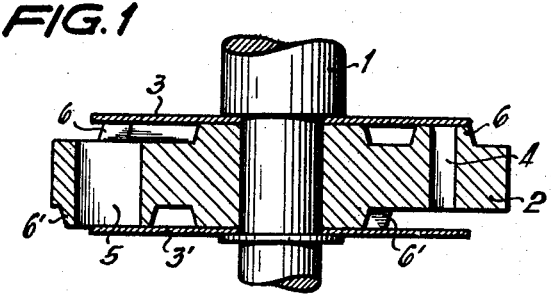
FIG. 1 shows a piston of a preferred embodiment of the shock absorber of the invention in axial cross section on the line I—I of FIG. 2.
Figure 2:
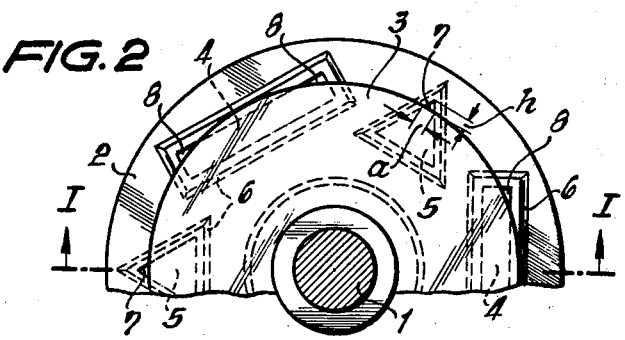
FIG. 2 shows the piston of FIG. 1 in a plan view from which one half of the piston is omitted.

Referring now to the drawing in detail and initially to FIGS. 1 and 2, there is shown a piston 2 reciprocable in a cylinder (not shown) while the piston and cylinder are fastened to the sprung and unsprung masses of a motor car respectively. Forces are transmitted to the piston 2 by a piston rod 1 on which the piston 2 is fixedly fastened. Two identical circular plates 3, 3' of spring metal are centrally and coaxially mounted on the opposite axial end faces of the piston 2.

The piston is formed with six axial passages or conduits which are eccentrically arranged approximately along a circle having the same diameter as the discs 3, 3'. Three elongated rectangular passages 4 alternate along the circle with three passages 5 of equilaterally triangular cross section. The longer sides of the rectangles which constitute the cross section of the passages 4, and one of the sides of the triangles of passages 5 are tangentially arranged relative to the piston axis.

The plate 3 covers a major portion of the orifices of each of the passages 4, and the plate 3' similarly covers major portions of the triangular passages 5 on the opposite piston face. Minor portions of all passages are left permanently unobstructed. The latter portions are defined by short free edge portions of the plates 3 and 3' which for the purposes of this discussion may be considered to be rectilinear although they are actually arcs of a circle.

As best seen from FIG. 2, the plate 3 covers the rectangular passages 4 except for small areas 8 in two corners of the orifice. The plate 3' covers the triangular passages 5 except for a small corner area 7. In the latter case the length $a$ of the free edge portion of the plate 3' which defines the boundary between the minor permanently open portion 7 of the passage and the major temporarily obstructed orifice portion in the normal position of the spring plate 3' is larger than the radial dimension $h$ of the triangular area by a factor of 1.155 (two thirds of the square root of three), and the same relationship holds for the radial and circumferential dimensions of the minor triangular area. The two walls of the passage 5 which intersect the edge of the plate 3 define an angle of 60° therebetween. In the case of the rectangular passage 4, the ratio between the length of the intersecting edge portion of the plate 3 and the radial dimension of the permanently open orifice area 8 is somewhat greater than 1.155, but still smaller than 2, and the walls intersecting the edge define an angle of 90°. In both cases, minor variations in the diameter of the plates 3, 3', in the dimensions of the passages 4, 5, and in their relative positions will not significantly influence the size of the permanently open passage areas, nor the relationship between the permanently open and the controlled area.

The two faces of the piston have raised rims 6, 6' about the orifices of the passages 4 and 5 respectively. The rims support the spring plates 3, 3' about the orifices and prevent them from buckling under the pressure of the fluid when in the closed position. The rims also serve as spacers which hold each plate away from the orifice of the passage controlled by the other spring plate. The pressure of the fluid acts on the plates 3, 3' over almost equal areas in the closed and open condition of the valves formed by the plates, the difference being determined by the narrow face area of the rims 6, 6' in contact with the respective spring plate in the closed condition of the valve, and being very small.

The piston illustrated in FIGS. 1 and 2 operates as follows:

During minor or relatively slow relative movements of the piston and the cylinder, the permanently open passage areas 7 and 8 are sufficient to permit the necessary flow of fluid between the cylinder spaces on opposite sides of the piston 2. When the piston moves relatively quickly, one of the spring plates 3, 3' flexes or pivots axially away from the corresponding orifice and releases the entire cross sectional area thereof for the passage of fluid.

In order to obtain the smoothest possible transition from a condition of fluid flow through the permanently open passages areas to a condition in which fluid may flow through passages unobstructed by the corresponding spring plates, it is necessary to maintain a predetermined relationship between the respective flow sections. This relationship must be determined experimentally in each case. It depends on such variables as the properties of the springs cooperating with the shock absorbers, and on the desired quality of the ride of the vehicle which is a matter of personal preference. The dimensional relationships illustrated in the drawing are typical of those which will be found satisfactory.

In all cases, the ratio between total flow section and permanently open flow section will be large. The intersecting edge portion of the spring plate should be relatively short, that is, not more than twice the dimension of the minor unobstructed orifice portion in a radial direction away from the edge portion. In other words, the angle between the intersected axially extending passage walls should be as small as possible so that the change in passage cross section with pivotal movement of the spring plate away from the passage orifice be gradual.

These requirements are fulfilled when the angle is not appreciably greater than the 90° angle shown in the orifices of the passage 4, and when the relationship between the maximum circumferential dimension of the permanently open passage area to its maximum radial dimension does not exceed a ratio of 2:1. Preferably, this ratio is not appreciably greater than unity, and best results are obtained when it is 1:2. Correspondingly, the angle defined by the walls is preferably 60° or less, and smaller than 30° for the best results.

The axial passages through the piston and their orifices may assume many different shapes without departing from the spirit of this invention, and additional examples of such shapes are illustrated in FIG. 3 to 6. The modified piston of FIGS. 3 and 4 has six passages of alternate cross-sectional drop and kidney shapes. The narrow ends 12 of the drop shaped passages 9 extend radially outward beyond the free edge of the plate 3' and are permanently open. The kidney shaped passages 10 have radial projections 11 which are intersected by the free edge of the plate 3. Tangents T drawn on the face portions or walls of the rims 6, 6' in the passage orifices where they intersect the free plate edges define angles $\alpha$ of somewhat less than 60°. Tangents T drawn on the walls of the rims in the drop-shaped orifices 9 define angles $\alpha$ of slightly less than 45°.

Figure 3:
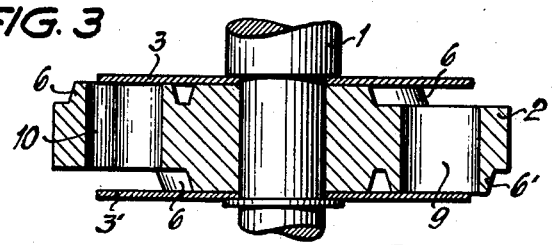
FIG. 3 illustrates a second embodiment of the piston of the invention in a view taken on line III—III of FIG. 4.
Figure 4:
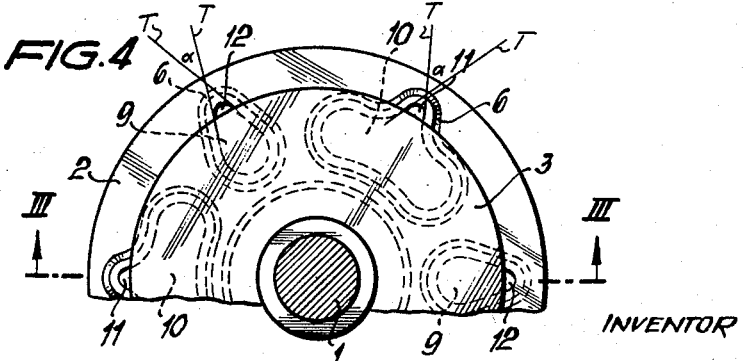
FIG. 4 shows the piston of FIG. 3 in a view corresponding to that of FIG. 2.
Figure 5:
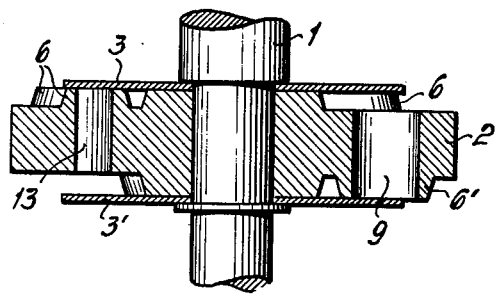
FIG. 5 illustrates yet another piston for a shock absorber, the view being taken in axial section on the line V—V of FIG. 6.
Figure 6:
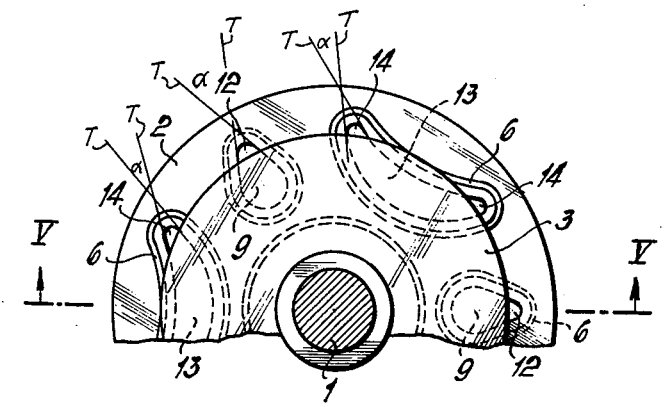
FIG. 6 shows the piston of FIG. 5 in partial plan view.

In the piston illustrated in FIGS. 5 and 6, drop shaped orifices 9 substantially identical with those shown in FIGS. 3 and 4 alternate circumferentially with orifices that are sickle shaped in cross section. The two arcuate rims 6 which define the sickle shape are centered on respective axes that are radially spaced from the piston axis, and convex faces of the rims are directed toward the latter. The points 14 of the sickle shaped orifice 13 are intersected by the free edge of the plate 3. Tangents T drawn on the faces of the rims 6 at the intersection of the free edge with the walls of the sickle shaped orifices define an angle of approximately 30°. In this arrangement, the sensitivity to manufacturing tolerances and minor misadjustments is particularly low, and the ratio of the permanently open passage area to the total passage area available when the plate 3 is pivoted away from the passage orifices is most favorable.

The mode of operation of the devices shown in FIGS. 3 to 6 is basically the same as that of the apparatus of FIGS. 1 and 2 described hereinabove in more detail.

All embodiments of the invention are distinguished by the smooth transition from fluid flow through the permanently open passage portions to a condition in which fluid may flow virtually unimpeded through the entire cross section of the passages. This avoids noise and discomfort to the passengers of the car equipped with the shock absorbers. The devices of the invention are fully operable even when their parts are not manufactured to close tolerances, and are not assembled with the utmost precision. This is possible even where the permanently open passage areas are chosen to be but a very small fraction of the controlled passage area.

Various modifications are contemplated and may obviously be resorted to by those skilled in the art without departing from the spirit and scope of the invention as hereinafter defined by the appended claims, as only preferred embodiments thereof have been disclosed.

What I claim is:

1. In an oscillation damping device of the piston-and-cylinder type, in combination, a piston having two faces and formed with a conduit having respective orifices in said faces; and a resilient plate member mounted on one of said faces and normally in a position to obstruct a major portion of the orifice in said one face, and to leave a minor portion thereof unobstructed for the passage of fluid through said conduit, said plate member being responsive to a predetermined pressure of said fluid to move away from said orifice, said plate member in the normal position thereof having a free edge portion intersecting said orifice and defining a boundary between said major portion and said minor portion, the length of said intersecting edge portion being not more than twice the largest dimension of said minor portion in a direction perpendicularly away from said edge portion.

2. In a device as set forth in claim 1, the cross section of said orifice including a projection, said free edge portion intersecting said projection and at least a portion of said projection constituting said minor portion.

3. In a device as set forth in claim 1, said orifice being of substantially polygonal shape, said free edge portion intersecting a corner of the polygon, at least a portion of said corner constituting said minor portion.

4. In an oscillation damping device of the piston-and-cylinder type, in combination, a piston having two faces and formed with a conduit having respective orifices in said faces; and a resilient plate member mounted on one of said faces and normally in a position to obstruct a major portion of the orifice in said one face, and to leave a minor portion thereof unobstructed for the passage of fluid through said conduit, said plate member being responsive to a predetermined pressure of said fluid to move away from said orifice, said plate member in the normal position thereof having a free edge portion intersecting said orifice and defining a boundary between said major portion and said minor portion, the cross sectional dimension of said minor portion in a direction away from said free edge portion being at least substantially equal to the cross sectional dimension of said minor portion in the general direction of said edge portion.

5. In an oscillation damping device of the piston-and-cylinder type, in combination, a piston having an axis and two axial end faces, said piston being formed with a conduit having orifices in said faces; and a substantially circular resilient plate member centrally mounted on said piston and normally extending radially outward to obstruct a major portion of one of said orifices and to leave a minor portion thereof permanently unobstructed for the passage of fluid through said conduit, said plate member being responsive to a predetermined pressure of said fluid to move away from said one orifice and having a free edge portion intersecting said orifice in the normal position of said plate member, said edge portion defining a boundary between said major and said minor portions, the circumferential length of said intersecting edge portion being not more than twice the largest radial dimension of said minor portion.

6. In an oscillation damping device of the piston-and-cylinder type, in combination, a piston having an axis and two axial end faces, said piston being formed with a conduit having orifices in said faces; and a substantially circular resilient plate member centrally mounted on said piston and normally extending radially outward to obstruct a major portion of one of said orifices and to leave a minor portion thereof permanently unobstructed for the passage of fluid through said conduit, said plate member being responsive to a predetermined pressure of said fluid to move away from said one orifice and having a free edge portion intersecting said orifice in the normal position of said plate member, said edge portion defining a boundary between said major and said minor portions, the radial dimension of said minor portion being at least substantially equal to the circumferential dimension thereof.

7. In an oscillation damping device of the piston-and-cylinder type, in combination, a piston having two faces and formed with a conduit having respective orifices in said faces; and a resilient plate member mounted on one of said faces and normally in a position to obstruct a major portion of the orifice in said one face and to leave a minor portion thereof unobstructed for the passage of fluid through said conduit, said plate member being responsive to a predetermined pressure of said fluid to move away from said orifice, said plate member having a free edge portion intersecting the walls of said orifice in the normal position of said plate member, and defining a boundary between said major portion and said minor portion, tangents drawn on said walls at their intersection with said free edge portion defining therebetween an angle not substantially greater than 90°, the cross sectional dimension of said minor portion in a direction away from said boundary being at least one half of the cross sectional dimension of said minor portion in the general direction of said boundary.

8. In a device as set forth in claim 7, the angle defined by said walls being not greater than 60°.

References Cited in the file of this patent
UNITED STATES PATENTS

| | | |
|---|---|---|
| 2,683,505 | Girard | July 13, 1954 |
| 2,807,336 | Sweeney | Sept. 24, 1957 |
| 2,828,836 | Kamman | Apr. 1, 1958 |
| 2,987,146 | Allinquant | June 6, 1961 |
| 3,003,594 | Carbon | Oct. 10, 1961 |
| 3,003,597 | Carbon | Oct. 10, 1961 |
| 3,076,529 | Zeidler | Feb. 5, 1963 |

FOREIGN PATENTS

| | | |
|---|---|---|
| 1,080,670 | France | June 2, 1954 |
| 69,777 | France | Sept. 29, 1958 |
| 1,230,908 | France | Apr. 4, 1960 |